United States Patent [19]
Hill

[11] Patent Number: 6,088,744
[45] Date of Patent: Jul. 11, 2000

[54] MULTIPORT DATA BUFFER HAVING MULTI LEVEL CACHING WHEREIN EACH DATA PORT HAS A FIFO BUFFER COUPLED THERETO

[75] Inventor: Gregory A. Hill, Loveland, Colo.

[73] Assignee: Agilent Technologies, Palo Alto, Calif.

[21] Appl. No.: 09/023,837

[22] Filed: Feb. 13, 1998

[51] Int. Cl.[7] .................................................. G06F 13/00
[52] U.S. Cl. .............................. 710/53; 710/11; 710/20; 712/29; 712/223; 370/392
[58] Field of Search .................................. 710/11, 20, 29, 710/53, 61; 370/392; 712/28, 29, 223; 711/119

[56] References Cited

U.S. PATENT DOCUMENTS

| 5,214,760 | 5/1993 | Hammond et al. | 395/250 |
| 5,699,530 | 12/1997 | Rust et al. | 395/250 |
| 5,805,930 | 9/1998 | Rosenthal et al. | 395/877 |
| 5,822,308 | 10/1998 | Weigand et al. | 370/280 |
| 5,841,722 | 11/1998 | Willenz | 365/221 |
| 5,991,299 | 11/1999 | Radogna et al. | 370/392 |
| 6,018,778 | 1/2000 | Stolowitz | 710/61 |

OTHER PUBLICATIONS

High Performance Serial Bus, IEEE Std. 1394–1995, pp. 145–153.

*Primary Examiner*—Thomas C. Lee
*Assistant Examiner*—Twanna Gossom

[57] ABSTRACT

A three port FIFO buffer circuit uses off the shelf static RAM and dedicated shallow, e.g. 16 word, FIFOs in a multi-level caching scheme. The circuit results in multiple, reconfigurable, deep (e.g. up to 32k word) FIFO buffers. The preferred embodiment of the invention provides a buffer that comprises a bank of 32k word RAM, six dual port 16-word FIFOs, and associated sequencing logic. The sequencing logic includes RAM address registers/counter associated with each of the six FIFOs, and manages the movement of data into and out of the RAM.

14 Claims, 3 Drawing Sheets

MULTIPORT DATA BUFFER HAVING MULTI LEVEL CACHING WHEREIN EACH DATA PORT HAS A FIFO BUFFER COUPLED THERETO

BACKGROUND OF THE INVENTION

1. Technical Field

The invention relates to the transfer of information in an electronic network between system elements having different data transfer rates. More particularly, the invention relates to a three port FIFO data buffer having multi-level caching.

2. Description of the Prior Art

Various data transfer techniques have evolved as the need to move information, in terms of both speed and quantity, has increased. One promising technique is provided by the Firewire (IEEE 1394) specification. Proposed actual data rates (i.e. independent of any encoding scheme) for Firewire are in multiples of ~100 Mbit/s.

While Firewire provides a synchronous serial bus having a data transfer rate of ~43 Mbit/s, other protocols that may be provided in a common system with Firewire have different data transfer characteristics. For example, VME/VXI provides an asynchronous parallel bus having a data transfer rate of 0–80 Mbit/s.

It is not possible, in general, to transfer data directly from a device on a first of the foregoing buses, over the first bus itself, through a direct interface and over a second bus, to a target device on the second bus. In addition, the packet oriented protocol of Firewire (IEEE 1394) includes CRC verification for each packet which may be inconsistent with other protocols.

To accommodate such data transfer, the interface device must incorporate at least some buffering capability.

It would be advantageous to provide a data buffer that is flexible enough to handle high speed data transfers between the buses, configuration messages between a Firewire controller device and the interface device control processor, character string translations from Firewire packets to VXI bus message based protocol transfers, and asynchronous interrupts from VME/VXI devices to a Firewire controller.

SUMMARY OF THE INVENTION

The invention provides a three port FIFO buffer circuit that uses off the shelf static RAM and dedicated shallow, e.g. 16 word, FIFOs in a multi-level caching scheme. The circuit results in multiple, reconfigurable, deep (e.g. up to 32k word) FIFO buffers.

The preferred embodiment of the invention provides a buffer that comprises a bank of 32k word RAM, six dual port 16-word FIFOs, and associated sequencing logic. The sequencing logic includes RAM address registers/counter associated with each of the six FIFOs, and manages the movement of data into and out of the RAM.

To move data into a RAM buffer from one of the three ports, a processor first instructs the control logic to clear, i.e. make empty, the port's input FIFO and disable the associated sequencing logic. The processor then writes an address to that FIFO's address counter, establishing the starting RAM address for the buffer. Next, the processor enables the sequencer logic for the input FIFO. The sequencer logic attempts to keep the FIFO empty by moving data to the RAM. When data are written to the input FIFO by the associated external device, the sequencer detects that the FIFO is not empty. A synchronous arbiter resolves simultaneous RAM accesses. After each RAM write, the sequencer increments the FIFO's RAM address counter.

To move data from a RAM buffer to one of the three ports, the processor first instructs the control logic to clear (i.e. make empty) the port's output FIFO and disable the associated sequencing logic. The processor then writes the buffer's start address to the FIFO's address counter. Next, the processor enables the sequencer logic for the output FIFO. The sequencer then fills the output FIFO with data from successive RAM buffer addresses. Next, the sequencer logic attempts to keep the FIFO full by moving data from the RAM. When the data are read from the output FIFO by the associated external device, the sequencer detects that the FIFO is not full. When the FIFO is not full, the sequencer moves data from the rAM to the output FIFO until the FIFO is again full. A synchronous arbiter resolves simultaneous RAM accesses. After each RAM read, the sequencer increments the FIFO's RAM address counter.

DETAILED DESCRIPTION OF THE INVENTION

Firewire provides a protocol for a multi-master serial data bus that transfers packets of data between devices. These packets have various formats. The invention facilitates the handling of certain packets that have both headers and data block payloads, e.g. Write Request for Data Block and Read Response for Data Block. The invention works together with a Link Layer Controller (LLC) that is capable of storing and analyzing Firewire data headers internally, and moving the data blocks through a dedicated interface. The invention provides a three port FIFO buffer circuit that uses off the shelf static RAM and dedicated shallow, e.g. 16 word, FIFOs in a multi-level caching scheme. The circuit results in multiple, reconfigurable, deep (e.g. up to 32k word) FIFO buffers.

Figure 1:
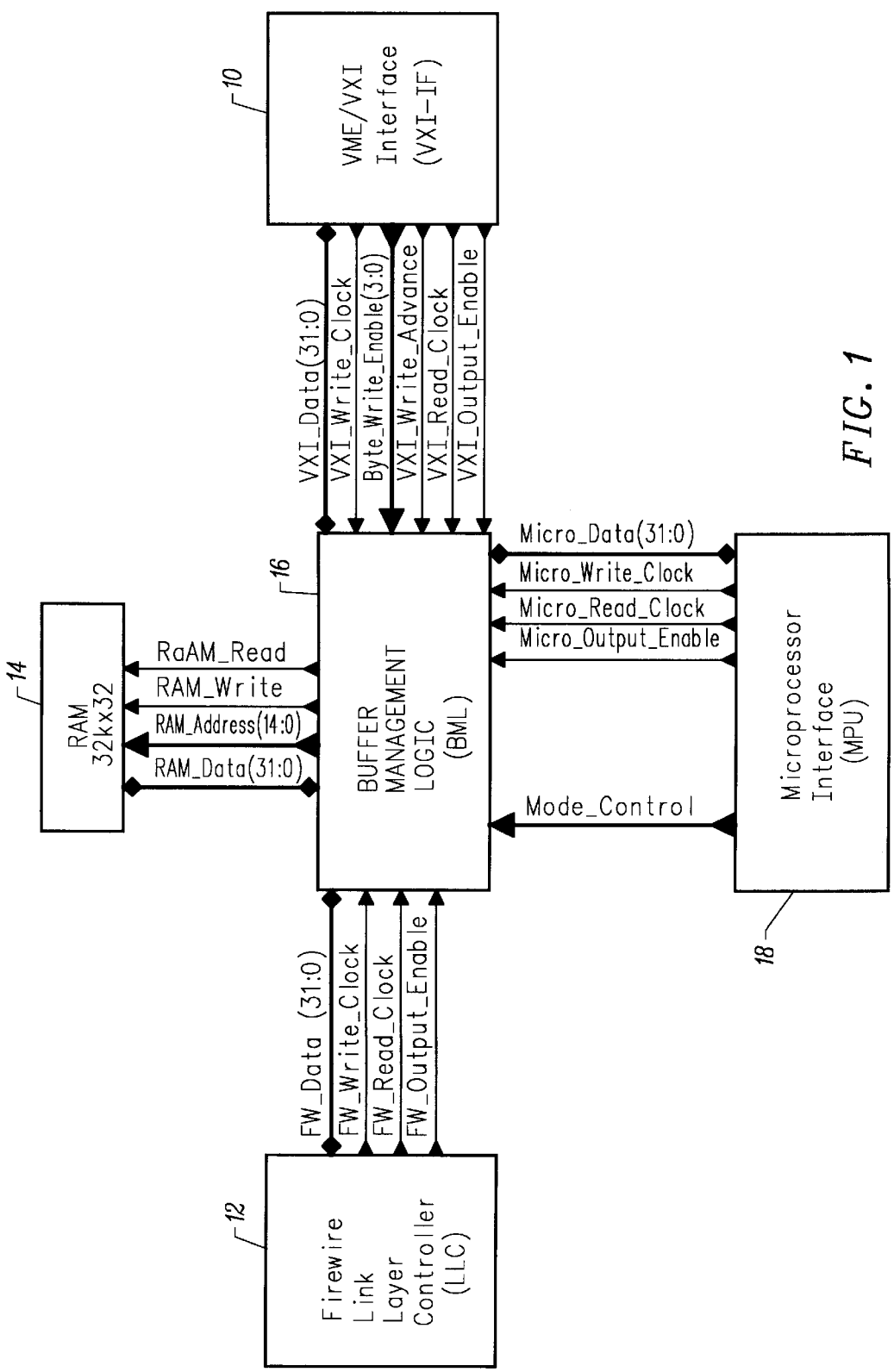
FIG. 1 is a block schematic diagram of a three port FIFO buffer having multi-level caching according to the invention.

FIG. 1 is a block schematic diagram of a three port FIFO buffer having multi-level caching according to the invention. A Firewire to VME/VXI interface device can be constructed using an LLC 12, VME/VXI interfacing hardware (VXI-IF) 10, a processor such as a state machine or preferably a programmed microprocessor (MPU) 18, RAM 14, and buffer management logic (BML) 16, as shown in FIG. 1.

When receiving one of the data block payload packets, the LLC stores the incoming packet header internally, sends the data packet to the BML, and notifies the MPU. The BML stores the data packet in the RAM. The MPU reads the Firewire header from the LLC. Depending on the higher-level protocol in operation, the MPU may then read the first few words of data from the RAM to determine the disposition of the data block. The MPU then either reads the remainder of the data block, or instructs the BML and VXI-IF to transfer the data block to a VXI device. In some cases, the MPU may initiate such a transfer to a VXI bus device without having to read any of the data blocks first.

When sending a data block payload packet, the MPU writes Firewire header information to the LLC, then writes data to the RAM and/or instructs the VXI-IF and BML to read data from a VXI device into the RAM. The MPU then instructs the LLC to send the Firewire packet.

In the preferred embodiment, the invention moves blocks of data between any two of the Firewire, VME/VXI, and microprocessor interfaces. This is accomplished by moving data first from the source interface to RAM, then from RAM to the destination interface. It is assumed that the transfer to RAM is completed before the transfer from RAM is begun. Accordingly no provision is made to interlock these transfers to prevent overrun or starvation scenarios. In the preferred embodiment, the overall process is managed by a local microprocessor.

For example, to move a block of data from the LLC to the VXI-IF, the MPU first enables the BML to move data words received from the LLC into RAM at some starting address A. This is accomplished through manipulation of the Mode Control lines. The Mode Control signals are derived from MPU controlled write registers (well understood by skilled designers). The MPU then enables the LLC to begin the data transfer. When a packet is received, the LLC sends data over the FW_data signal lines, clocking each word into the BML with the FW_Write_Clock signal. At the end of the transfer, the LLC notifies the MPU, which then enables the BML for VXI reads of the data beginning at RAM address A. The MPU then configures the VXI-IF to read data words from the BML and write them to a VXI device.

In a similar fashion, data can be moved from the LLC to the MPU, the VXI-IF to the LLC, the VXI-IF to the MPU, the MPU to the LLC, and the MPU to the VXI-IF.

The fact that MPU can specify the starting address of any data movement affords several advantages. For example, failed transactions can be retried, data blocks can be appended and split, and multiple data blocks can be maintained in the RAM, allowing simultaneous and overlapping transactions. For example, while the VXI-IF is reading one block from RAM, the MPU can be reading from a second RAM area, and the LLC can be writing another block to a third RAM area.

Figure 2:
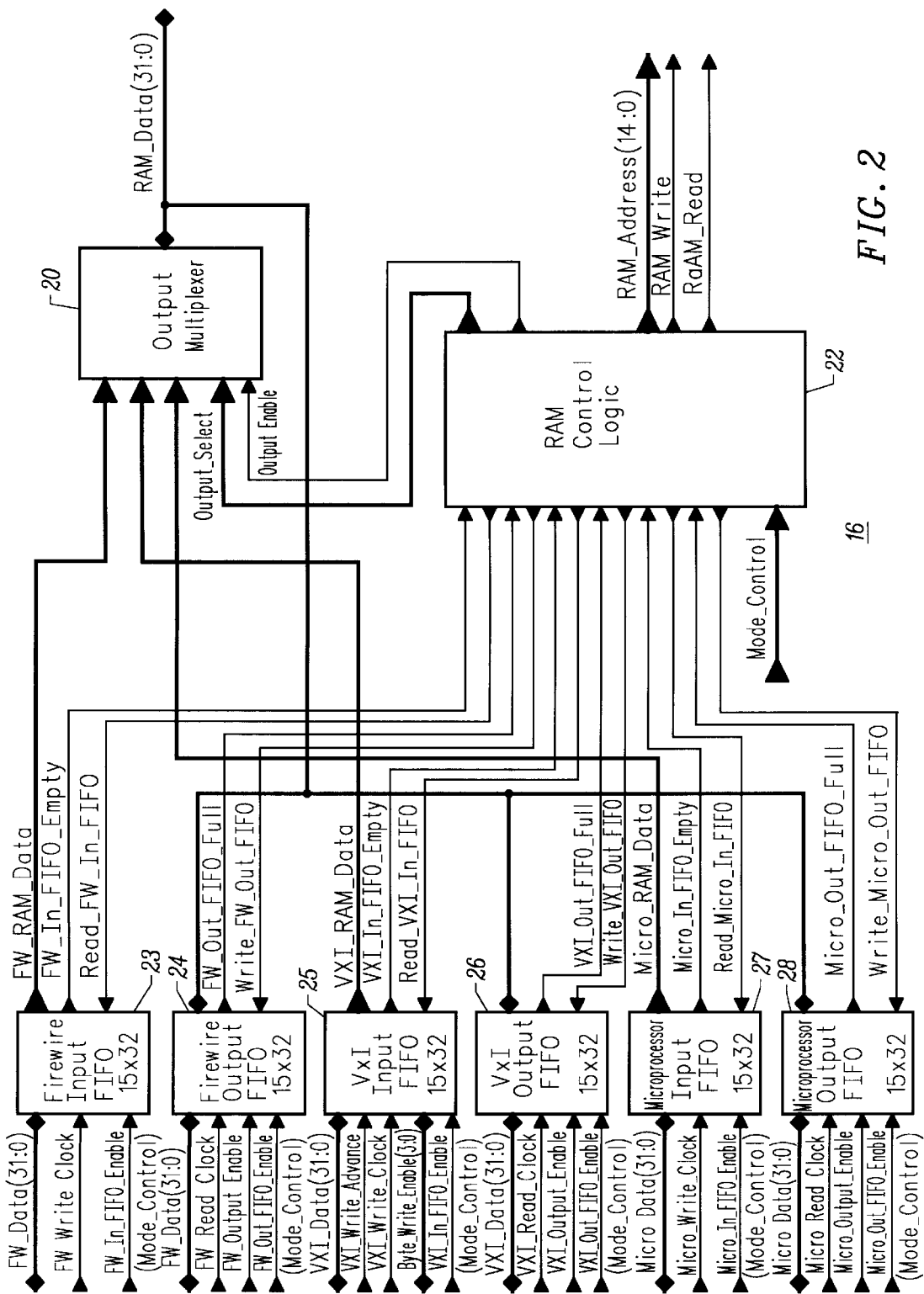
FIG. 2 is a detailed block schematic diagram of a three port FIFO buffer having multi-level caching of FIG. 1.

FIG. 2 is a detailed block schematic diagram of a three port FIFO buffer having multi-level caching of FIG. 1. The preferred embodiment of the invention provides a buffer that comprises a bank of 32k word RAM 14 (FIG. 1), six dual port 16-word FIFOs 23–28, and associated sequencing logic 20, 22. Internally, the BML 16 has six dedicated FIFOs (See FIG. 2), each caching either input or output data at one of the interface ports (LLC, VXI-IF, or MPU). Data flow between these FIFOs and RAM is regulated by the RAM Control Logic (RCL) 22, which simply attempts to keep the input FIFOs empty and the output FIFOs full.

The Firewire Input FIFO 23 receives data from the LLC for transfer to RAM. When the Mode Control signal FW_In_FIFO_Enable is false, the FIFO 23 is held in a reset state and indicates that to the RCL that it is empty by driving the FW_In_FIFO_Empty signal true. When the Mode Control signal FW_In_FIFO_Enable is true, the FIFO 23 is active. In the active state, positive edges of FW_Write_Clock clock data into the FIFO. Whenever the FIFO contains at least one word of data, it drives the FW_In_FIFO_Empty signal false. This eventually causes the RCL to remove data from the FIFO until the FIFO is again empty, and drives the FW_In_FIFO_Empty signal true.

When the RCL removes data from the FIFO, it enables the Output Multiplexer 20 to drive the FW_RAM_Data onto the RAM_Data bus, drives the appropriate address onto the RAM_Address bus, pulses the RAM_Write signal true, and pulses the Read_FW_In_FIFO signal true. The trailing edge of the Read_FW_In_FIFO pulse advances the FIFO to its next output value, removing the data.

In the preferred embodiment, the VXI and Microprocessor input FIFOs 25, 27 operate in a similar fashion. However the VXI input FIFO 25 is enhanced to allow writes of 8 and 16 bits at a time to different positions within a word, thus enabling the FIFO to be filled 8 or 16 bits at a time. This is accomplished using the four Byte_Write_Enable signals which each enable data to be written to one of the four bytes in a 32 bit word on the positive edges of the VXI_Write_Clock signal. As the last byte is written to each word, the VXI-IF also asserts the VXI_Write_Advance signal to indicate that the word is filled and the FIFO should advance to its next input location.

The Firewire Output FIFO 24 holds data from the RAM to be read by the LLC. When the Mode Control signal FW_Out_FIFO_Enable is false, the FIFO is held in a reset state and indicates that to the RCL that it is full by driving the FW_Out_FIFO_Full signal true. When the Mode Control signal FW_Out_FIFO_Enable is true, the FIFO is active. Upon transition into the active state, the FIFO, being empty, immediately indicates that it is not full and drives the FW_Out_FIFO_Full false. This eventually causes the RCL to write data from the RAM into the FIFO until it is full, and drives the FW_Out_FIFO_Full signal true. When the FIFO is in the active state, positive edges of FW_Read_Clock clock data out of the FIFO into the LLC. Whenever the FIFO contains less than 15 words of data it drives the FW_Out_FIFO_Full false, causing the RCL to again fill it. When the RCL writes data to the FIFO, it disables the Output Multiplexer from driving data onto the RAM_Data bus, drives the appropriate address onto the RAM_Address bus, pulses the RAM_Read signal true, and pulses the Write_FW_Out_FIFO signal true, clocking the data into the FIFO. While reading data from the FIFO, the LLC drives the FW_Output_Enable signal true to enable the BML to drive the FW Data bus.

In the preferred embodiment, the VXI and Microprocessor output FIFOs 26, 28 operate in a similar fashion.

Figure 3:
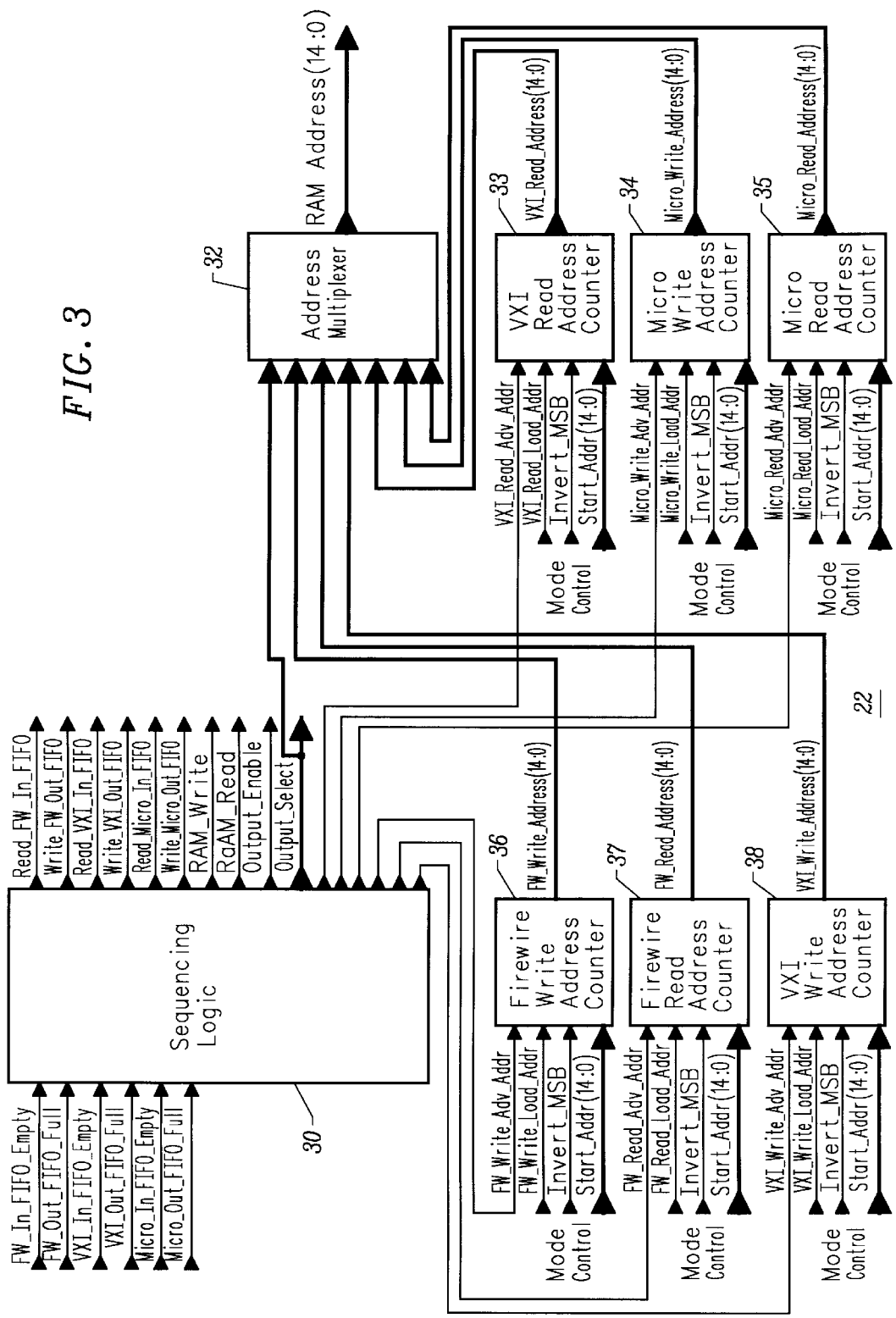
FIG. 3 is a block schematic diagram showing the sequencing logic for the three port FIFO buffer having multi-level caching of FIGS. 1 and 2.

FIG. 3 is a block schematic diagram showing the sequencing logic for the three port FIFO buffer having multi-level caching of FIGS. 1 and 2. The sequencing logic 30 includes RAM address registers/counters 33–38 associated with each of the six FIFOs, and manages the movement of data into and out of the RAM. Internally, the RCL includes six address counters—corresponding to the six FIFOS in the BML, a RAM Address Multiplexer 32, and the Sequencing Logic 30. Each counter is a loadable 14 bit up counter. In addition, the least significant bit of each counter may be inverted to facilitate efficient byte swapping for different host computer architectures (big-endian, little endian). This allows 32 bit halves of 64 bit words to be swapped on the fly.

The Firewire Write Address Counter 36 generates the RAM addresses for data written by the LLC to the RAM. A positive edge of the FW_Write_Load_Addr signal clocks the Start_Addr data into the counter, and the Invert_MSB signal into a register. If the clocked Invert_MSB is true, then the least significant bit of the address counter (FW_Write_Address(0)) is inverted from its normal state. Negative edges of the FW_Write_Adv_Addr signal cause the counter to increment. The other address counters operate similarly.

The Sequencing Logic 30 is a clocked state machine that senses the various FIFO full and empty signals, schedules RAM accesses, and coordinates the RAM read and write cycles. This machine executes one RAM access per clock cycle and schedules accesses according to the following rules:

To provide for fairness, no type of access may be performed in consecutive cycles.

Top priority is assigned to writes from the LLC, followed by reads to the LLC, then writes from the VXI-IF, then reads to the VXI-IF, then writes from the MPU, and finally reads to the MPU.

A write from an interface is requested by a false indication on the corresponding In_Fifo_Empty signal. A read to an interface is requested by a false indication on the corresponding Out_FIFO_Full signal.

If no request is active, the RAM address and control signals indicate a read of address 0.

A write from the LLC's input FIFO to the RAM is executed as follows:

When the FW_In_FIFO_Empty signal is false, the sequencing logic drives (for one clock cycle) Output Select to "FW Write", Output_Enable true, RAM_Write true, RAM_Read false, FW_Write_Adv_Addr true, Read FW_In_FIFO true. Other write operations proceed similarly.

A read to the LLC's output FIFO from the RAM is executed as follows:

When the FW_Out_FIFO_Full signal is false, the sequencing logic drives (for one clock cycle) Output_Select to "FW_Read", Output_Enable False, RAM_Write false, RAM_Read true, FW_Read_Adv_Addr true, Write_FW_Out_FIFO true. Other read operations proceed similarly.

The following describes the process steps executed to transfer data to and from the three port FIFO buffer having multi-level caching according to the invention.

To move data into a RAM buffer from one of the three ports, the processor first instructs the control logic to clear, i.e. make empty, the port's input FIFO and disable the associated sequencing logic. The processor then writes an address to that FIFO's address counter, establishing a starting RAM address for the buffer. Next, the processor enables the sequencer logic for the input FIFO. The sequencer logic attempts to keep the FIFO empty by moving data to the RAM. When data are written to the input FIFO by the associated external device, the sequencer detects that the FIFO is not empty. A synchronous arbiter resolves simultaneous RAM accesses. After each RAM write, the sequencer increments the fifo's RAM address counter.

To move data from a RAM buffer to one of the three ports, the processor first instructs the control logic to clear (i.e. make empty) the port's output FIFO and disable the associated sequencing logic. The processor then writes the buffer's start address to the FIFO's address counter. Next, the processor enables the sequencer logic for the output FIFO. The sequencer then fills the output FIFO with data from successive RAM buffer addresses. Next, the sequencer logic attempts to keep the FIFO full by moving data from the RAM. When the data are read from the output FIFO by the associated external device, the sequencer detects that the FIFO is not full. When the FIFO is not full, the sequencer moves data from the RAM to the output FIFO until the FIFO is again full. A synchronous arbiter resolves simultaneous RAM accesses. After each RAM read, the sequencer increments the FIFO's RAM address counter.

The RAM requires a bandwidth that is slightly higher than the sum of the maximum data rates of the three ports. For example, with a VME/VXI backplane that is capable of 20 Mwords/s, a Firewire interface that is capable of 12.5 Mwords/s, and a processor that requires 5 Mwords/s, the RAM bandwidth must exceed 37.5 Mwords/s.

Some advantages provided by the invention include:

The invention is readily implemented with an FPGA and common single port static RAM.

The invention requires 30–50% less RAM bandwidth than buffer implementations that do not incorporate dedicated shallow FIFOs.

The invention allows for pipelined and overlapped operations.

The invention allows for easy retries of failed transmissions.

This presently preferred embodiment of the invention has a 32 bit data path. However, other data path widths may also be used.

The preferred embodiment of the invention is clocked at 40 MHz for a 160 MBIT/s bandwidth, which is sufficient for VME rates of 80 MBIT/s, Firewire rates of 50 MBIT/s, and MPU accesses at >20 MBIT/s; and is clocked at 32 Mhz for a 128 MBIT/s bandwidth, which provides VXI rates of 64 MBIT/s, Firewire rates of 50 MBIT/s, and MPU accesses at ~>10 MBIT/s. The 40 MHz embodiment of the invention uses 10 ns RAM, while the 32 MHz embodiment of the invention uses 15 ns RAM.

The BML has been implemented in a Lucent OR2C12A-2 FPGA. Other technologies are also possible. In a custom silicon embodiment of the invention, the RAM could be included on-chip.

A 400 Mbit Firewire has 2k byte maximum packet size. The 32K×32 RAM has room for 64 packets. A reasonable minimum RAM size is four packets, or 2K×32 for 400 Mbit/s Firewire.

The inversion of RAM Address(O) for byte swapping can be extended to the n least significant bits for more flexible swapping. This requires n inversion control bits.

Performance can be enhanced, e.g. by registering many of the data and control signals and pipelining the operations. For simplicity, these enhancements have been omitted from the description, although they may be readily implemented in the invention by those skilled in the art.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A multi-port buffer providing multi-level caching, comprising:

buffer management logic, comprised of:
  a plurality of data ports;
  a plurality of FIFO buffers, wherein there is at least one FIFO buffer each for each said data port of said multi-port buffer, and wherein said FIFO buffers may comprise any of input and output buffers; and
  sequencing logic therefor; and a random access memory (RAM) for caching data routed to and from said FIFO buffers via said ports; and a microprocessor for moving data into and out of said RAM from one of said ports;

wherein said microprocessor moves data into said RAM from one of said ports by first instructing a control logic circuit to clear an input FIFO buffer associated with said port and disable associated sequencing logic, wherein said microprocessor then writes a FIFO start address to said FIFO buffer's address counter, wherein said microprocessor next enables said sequencing logic for said input FIFO buffer, wherein said sequencing logic attempts to keep said FIFO buffer empty by moving data to said RAM, wherein said sequencing logic detects that said FIFO buffer is not empty when data are written to said input FIFO buffer via said port by an associated external device, wherein a synchronous arbiter resolves simultaneous RAM accesses, and wherein said sequencing logic increments said FIFO buffer's RAM address counter after each RAM write.

2. A multi-port buffer providing multi-level caching, comprising:

buffer management logic, comprised of:
a plurality of data ports;
a plurality of FIFO buffers, wherein there is at least one FIFO buffer each for each said data port of said multi-port buffer, and wherein said FIFO buffers may comprise any of input and output buffers; and sequencing logic therefor; and
a random access memory (RAM) for caching data routed to and from said FIFO buffers via said ports; and
a microprocessor for moving data into and out of said RAM from one of said ports;

wherein said microprocessor moves data from said RAM to one of said ports by first instructing a control logic circuit to clear an output FIFO buffer associated with said port and disable associated sequencing logic, wherein said microprocessor then writes a FIFO buffer start address to said FIFO buffer's address counter, wherein said microprocessor next enables said sequencing logic for said output FIFO buffer, wherein said sequencing logic then fills said output FIFO buffer with data from successive RAM buffer addresses, wherein said sequencing logic attempts to keep said FIFO buffer full by moving data from said RAM, wherein said data are read from said output FIFO buffer via said port by an associated external device, wherein if said sequencing logic detects that said FIFO buffer is not full said sequencing logic moves data from said RAM to said output FIFO buffer until said FIFO buffer is again full, wherein a synchronous arbiter resolves simultaneous RAM accesses, and wherein said sequencing logic increments said FIFO buffer's RAM address counter after each RAM read.

3. A multi-port buffer providing multi-level caching, comprising:

a Firewire to VME/VXI interface;
a Firewire link layer controller;
a VME/VXI interface;
buffer management logic, comprised of:
a plurality of data ports;
a plurality of FIFO buffers, wherein there is at least one FIFO buffer each for each said data port of said multi-port buffer, and wherein said FIFO buffers may comprise any of input and output buffers; and sequencing logic therefor; and
a random access memory (RAM) for caching data routed to and from said FIFO buffers via said ports; and
a microprocessor for moving data into and out of said RAM from one of said ports;

wherein said link layer controller stores an incoming packet header internally, sends a data packet to said buffer management logic, and notifies said microprocessor when receiving a data packet, wherein said buffer management logic stores said data packet in said RAM, wherein said microprocessor reads a Firewire header from said link layer controller, wherein, depending on a higher-level protocol in operation, said microprocessor may optionally read a first few words of data from said RAM to determine the disposition of said data block, wherein said microprocessor then either reads a remainder of said data block, or instructs said buffer management logic and said interface to transfer said data block to a VXI device, and wherein said microprocessor may optionally initiate a transfer to said VXI bus device without first having to read any of said data blocks.

4. A multi-port buffer providing multi-level caching, comprising:

a Firewire to VME/VXI interface;
a Firewire link layer controller;
a VME/VXI interface;
buffer management logic, comprised of:
a plurality of data ports;
a plurality of FIFO buffers, wherein there is at least one FIFO buffer each for each said data port of said multi-port buffer, and wherein said FIFO buffers may comprise any of input and output buffers; and sequencing logic therefor; and
a random access memory (RAM) for caching data routed to and from said FIFO buffers via said ports; and
a microprocessor for moving data into and out of said RAM from one of said ports;

wherein said microprocessor writes Firewire header information to said link layer controller when sending a data packet, wherein said microprocessor writes data to said RAM and/or instructs said interface and said buffer management logic to read data from a VXI device into said RAM, and wherein said microprocessor then instructs said link layer controller to send said Firewire packet.

5. A multi-port buffer providing multi-level caching, comprising:

buffer management logic, comprised of:
a plurality of data ports;
a plurality of FIFO buffers wherein there is at least one FIFO buffer each for each said data port of said multi-port buffer, and wherein said FIFO buffers may comprise any of input and output buffers; and sequencing logic therefor; and
a random access memory (RAM) for caching data routed to and from said FIFO buffers via said ports; and
a microprocessor for moving data into and out of said RAM from one of said ports;

wherein said sequencing logic is a clock ed state machine that senses various FIFO buffer full and empty signals, schedules RAM accesses, and coordinates said RAM read and write cycles;

wherein said state machine schedules accesses according to any of the following rules:
no type of access may be performed in consecutive cycles;

top priority is assigned to writes from a link layer controller, followed by reads to said link layer controller, then writes from an interface, then reads to said interface, then writes from a microprocessor, and finally reads to said microprocessor;

a write from an interface is requested by a false indication on a corresponding in FIFO empty signal and a read to an interface is requested by a false indication on a corresponding out FIFO full signal; and if no request is active, RAM address and control signals indicate a read of address 0.

6. The multi-port buffer of claim 5, wherein one of said ports provides an interface, and wherein a write from said interface to said RAM is executed as follows:

when an input FIFO buffer empty signal is false, said sequencing logic configures said multi-port buffer to write data from said input FIFO buffer to said RAM.

7. The multi-port buffer of claim 5, wherein one of said ports provides an interface, and wherein a read to said interface from said RAM is executed as follows:

when an output FIFO buffer full signal is false, said sequencing logic configures said multi-port buffer to read data from said RAM to said output FIFO buffer.

8. A method for multi-level caching using a multi-port buffer, comprising the steps of:

providing a microprocessor for moving data into and out of said RAM from one of said ports;

providing buffer management logic, said buffer management logic comprised of:
  a plurality of data ports;
  a plurality of FIFO buffers, wherein there is at least one FIFO buffer each for each said data port of said multi-port buffer, and wherein said FIFO buffers may comprise any of input and output buffers; and
  sequencing logic therefor; and providing a random access memory (RAM) for caching data routed to and from said FIFO buffers via said ports;

moving data into said RAM from one of said ports by first instructing a control logic circuit to clear an input FIFO buffer associated with said port and disable associated sequencing logic;

writing a FIFO start address to said FIFO buffer's address counter;

enabling said sequencing logic for said input FIFO buffer;

attempting to keep said FIFO buffer empty by moving data to said RAM;

detecting that said FIFO buffer is not empty when data are written to said input FIFO buffer via said port by an associated external device;

resolving simultaneous RAM accesses; and incrementing said FIFO buffer's RAM address counter after each RAM write.

9. A method for multi-level caching using a multi-port buffer, comprising the steps of:

providing a microprocessor for moving data into and out of said RAM from one of said ports;

providing buffer management logic, said buffer management logic comprised of:
  a plurality of data ports;
  a plurality of FIFO buffers, wherein there is at least one FIFO buffer each for each said data port of said multi-port buffer, and wherein said FIFO buffers may comprise any of input and output buffers; and
  sequencing logic therefor; and providing a random access memory (RAM) for caching data routed to and from said FIFO buffers via said ports;

moving data from said RAM from one of said ports by first instructing a control logic circuit to clear an output FIFO buffer associated with said port and disable associated sequencing logic;

writing a FIFO buffer start address to said FIFO buffer's address counter;

enabling said sequencing logic for said output FIFO buffer;

filling said output FIFO buffer with data from successive RAM buffer addresses;

attempting to keep said FIFO buffer full by moving data from said RAM, wherein said data are read from said output FIFO buffer via said port by an associated external device;

moving data from said RAM to said output FIFO buffer until said FIFO buffer is again full if said sequencing logic detects that said FIFO buffer is not full;

resolving simultaneous RAM accesses; and incrementing said FIFO buffer's RAM address counter after each RAM read.

10. A method for multi-level caching using a multi-port buffer, comprising the steps of:

providing buffer management logic, said buffer management logic comprised of:
  a plurality of data ports;
  a plurality of FIFO buffers, wherein there is at least one FIFO buffer each for each said data port of said multi-port buffer, and wherein said FIFO buffers may comprise any of input and output buffers; and
  sequencing logic therefor; and providing a random access memory (RAM) for caching data routed to and from said FIFO buffers via said ports;

providing a Firewire to VME/VXI interface;

providing a microprocessor;

providing a Firewire link layer controller;

providing a VME/VXI interface;

storing an incoming packet header internally;

sending a data packet to said buffer management logic;

notifying said microprocessor when receiving a data packet;

storing said data packet in said RAM;

reading a Firewire header from said link layer controller;

optionally reading a first few words of data from said RAM to determine the disposition of said data block, then either:
  reading a remainder of said data block, or
  instructing said buffer management logic and said interface to transfer said data block to a VXI device; and optionally initiating a transfer to said VXI bus device without first having to read any of said data blocks.

11. A method for multi-level caching using a multi-port buffer, comprising the steps of:

providing buffer management logic, said buffer management logic comprised of:
  a plurality of data ports;
  a plurality of FIFO buffers, wherein there is at least one FIFO buffer each for each said data port of said multi-port buffer, and wherein said FIFO buffers may comprise any of input and output buffers; and sequencing logic therefor; and providing a random access memory (RAM) for caching data routed to and from said FIFO buffers via said ports;

providing a Firewire to VME/VXI interface;

providing a microprocessor;

providing a Firewire link layer controller;

providing a VME/VXI interface;

writing Firewire header information to said link layer controller when sending a data packet;

writing data to said RAM and/or instructing said interface and said buffer management logic to read data from a VXI device into said RAM; and instructing said link layer controller to send said Firewire packet.

12. A method for multi-level caching using a multi-port buffer, comprising the steps of:

providing buffer management logic, said buffer management logic comprised of:
a plurality of data ports;
a plurality of FIFO buffers, wherein there is at least one FIFO buffer each for each said data port of said multi-port buffer, and wherein said FIFO buffers may comprise any of input and output buffers; and sequencing logic therefor; and providing a random access memory (RAM) for caching data routed to and from said FIFO buffers via said ports;

wherein said sequencing logic is a clocked state machine that senses various FIFO buffer full and empty signals, schedules RAM accesses, and coordinates said RAM read and write cycles;

wherein said state machine schedules accesses according to any of the following rules:
no type of access may be performed in consecutive cycles;
top priority is assigned to writes from a link layer controller, followed by reads to said link layer controller, then writes from an interface, then reads to said interface, then writes from a microprocessor, and finally reads to said microprocessor;
a write from an interface is requested by a false indication on a corresponding in FIFO empty signal and a read to an interface is requested by a false indication on a corresponding out FIFO full signal; and
if no request is active, RAM address and control signals indicate a read of address 0.

13. The method of claim 12, wherein one of said ports provides an interface, and wherein a write from said interface to said RAM is executed as follows:

when an input FIFO buffer empty signal is false, said sequencing logic configures said multi-port buffer to write data from said input FIFO buffer to said RAM.

14. The method of claim 12, wherein one of said ports provides an interface, and wherein a read to said interface from said RAM is executed as follows:

when an output FIFO buffer full signal is false, said sequencing logic configures said multi-port buffer to read data from said RAM to said output FIFO buffer.

* * * * *